United States Patent
Neef et al.

(10) Patent No.: US 12,233,369 B2
(45) Date of Patent: Feb. 25, 2025

(54) AIR FILTER ELEMENT HAVING A CIRCUMFERENTIALLY PROTRUDING CLEAN AIR SEAL, FILTER HOUSING AND AIR FILTER

(71) Applicant: MANN+HUMMEL GmbH, Ludwigsburg (DE)

(72) Inventors: Pascal Neef, Trossingen (DE); Torsten Fritzsching, Vaihingen (DE); Philipp Hettkamp, Steinheim (DE); Arthur Sudermann, Steinheim (DE); Friedrich Kupfer, Marklkofen (DE); Mario Rieger, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 731 days.

(21) Appl. No.: 16/950,686

(22) Filed: Nov. 17, 2020

(65) Prior Publication Data

US 2021/0121807 A1    Apr. 29, 2021

Related U.S. Application Data

(63) Continuation of application No. PCT/EP2019/062265, filed on May 14, 2019.

(30) Foreign Application Priority Data

May 18, 2018   (DE) .......................... 102018004041.1

(51) Int. Cl.
*B01D 46/00*   (2022.01)
*B01D 46/24*   (2006.01)
(Continued)

(52) U.S. Cl.
CPC ..... *B01D 46/0005* (2013.01); *B01D 46/0004* (2013.01); *B01D 46/0049* (2013.01);
(Continued)

(58) Field of Classification Search
CPC ............ B01D 46/0005; B01D 46/0004; B01D 46/0049; B01D 46/521; B01D 46/522;
(Continued)

(56) References Cited

U.S. PATENT DOCUMENTS 5,669,949 A   9/1997   Dudrey et al.
6,004,366 A   12/1999   Engel et al.
(Continued)

FOREIGN PATENT DOCUMENTS

DE          19933205 A1 *  1/2001   ........... B01D 29/111
DE       102010006556 A1   12/2010
GB           1395396 A     5/1975

*Primary Examiner* — Robert A Hopkins
*Assistant Examiner* — Qianping He

(57) ABSTRACT

An air filter element for an air filter for an internal combustion engine is provided with a filter medium surrounding annularly a longitudinal axis of the air filter element. A first end disk is provided at a first end face of the air filter element, wherein the filter medium is embedded in the first end disk at the first end face. A clean air seal is configured to seal a raw side of the air filter against a clean side of the air filter. The clean air seal and the first end disk are embodied together as one piece. The clean air seal protrudes continuously radially past the filter medium. A filter housing for the air filter element is provided with a filter pot and a cover and has a clean air outlet and a raw air inlet arranged at a side wall of the filter pot.

22 Claims, 10 Drawing Sheets

(51) Int. Cl.
*B01D 46/52* (2006.01)
*F02M 35/02* (2006.01)
*F02M 35/024* (2006.01)

(52) U.S. Cl.
CPC ....... *B01D 46/2414* (2013.01); *B01D 46/521* (2013.01); *B01D 46/522* (2013.01); *F02M 35/0201* (2013.01); *F02M 35/02416* (2013.01); *F02M 35/02483* (2013.01); *B01D 2265/021* (2013.01); *B01D 2265/025* (2013.01); *B01D 2265/026* (2013.01); *B01D 2265/06* (2013.01); *B01D 2271/027* (2013.01); *B01D 2279/60* (2013.01); *F02M 35/0245* (2013.01)

(58) Field of Classification Search
CPC ........ B01D 2265/021; B01D 2265/025; B01D 2265/026; B01D 2265/06; B01D 2271/027; B01D 2279/60; B01D 29/111; B01D 29/21; B01D 2201/291; B01D 2201/34; F02M 35/0201; F02M 35/02416; F02M 35/02483; F02M 35/0245; F02M 35/024; F01M 11/03; F01M 2001/1014

USPC .......................................................... 55/492
See application file for complete search history.

(56) References Cited

U.S. PATENT DOCUMENTS

| | | |
|---|---|---|
| 6,261,334 B1 | 7/2001 | Morgan et al. |
| 6,638,332 B1 | 10/2003 | Schmitz et al. |
| 9,636,615 B2 | 5/2017 | Osendorf et al. |
| 9,861,922 B1 | 1/2018 | Townsend |
| 10,105,630 B2 | 10/2018 | Schulz |
| 2005/0193695 A1* | 9/2005 | Holmes .............. B01D 46/0002 55/482 |
| 2008/0041026 A1* | 2/2008 | Engel ................... B01D 46/521 55/432 |
| 2009/0071111 A1 | 3/2009 | Lundgren et al. |
| 2012/0060453 A1* | 3/2012 | Holzmann ......... B01D 46/4272 55/480 |
| 2014/0165518 A1 | 6/2014 | Ohashi et al. |
| 2015/0176544 A1 | 6/2015 | Kaufmann et al. |
| 2016/0129384 A1* | 5/2016 | Schulz .................. B01D 46/60 55/482 |
| 2017/0319998 A1* | 11/2017 | Girondi ................. B01D 29/15 |
| 2019/0308124 A1 | 10/2019 | Neef |

* cited by examiner

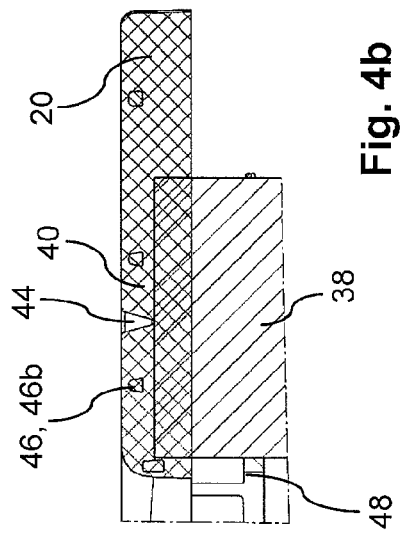
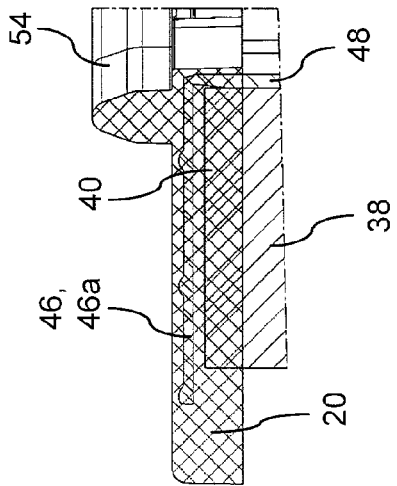
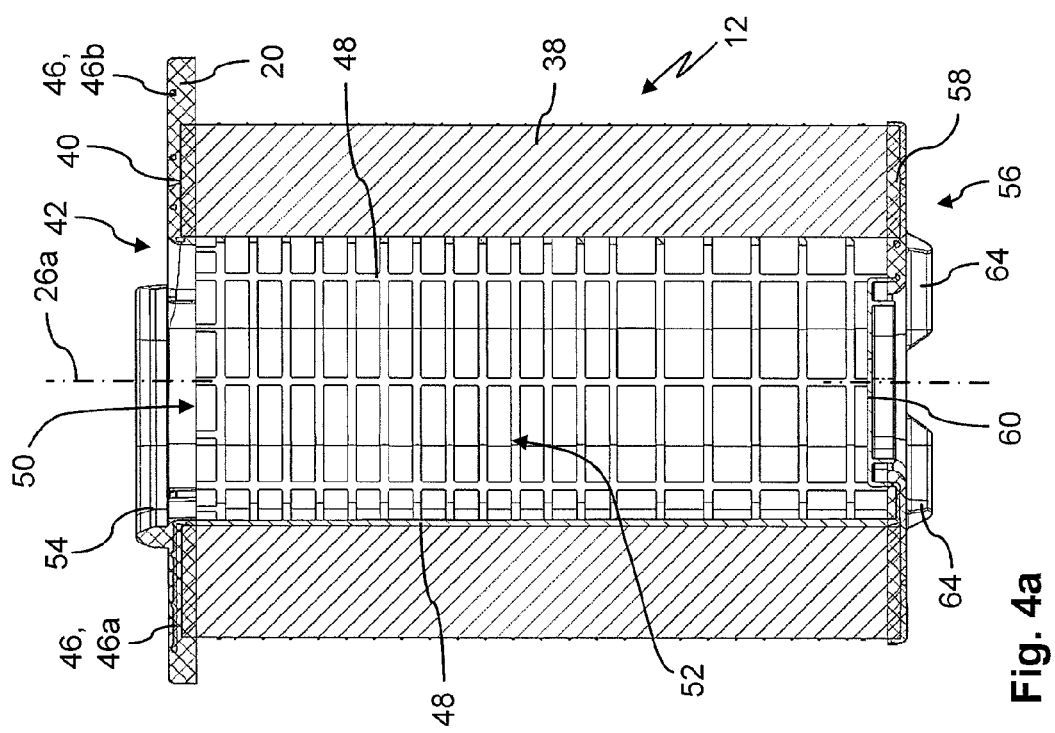

AIR FILTER ELEMENT HAVING A CIRCUMFERENTIALLY PROTRUDING CLEAN AIR SEAL, FILTER HOUSING AND AIR FILTER

CROSS-REFERENCE TO RELATED APPLICATIONS

This application is a continuation application of international application No. PCT/EP2019/062265 having an international filing date of 14 May 2019 and designating the United States, the international application claiming a priority date of 18 May 2018 based on prior filed German patent application No. 10 2018 004 041.1, the entire contents of the aforesaid international application and the aforesaid German patent application being incorporated herein by reference.

BACKGROUND OF THE INVENTION

The invention concerns an air filter element for an air filter for an internal combustion engine. Furthermore, the invention concerns a filter housing for an air filter. Finally, an air filter with an air filter element and a filter housing is subject matter of the invention.

The intake air of internal combustion engines is typically purified prior to entering a combustion chamber of the internal combustion engine by removing contaminants by means of an air filter. Air filter elements used for this purpose can comprise a star-shaped folded filter medium which surrounds a longitudinal axis in an annular shape. For internal combustion engines of commercial vehicles, for example, heavy trucks, such a filter element can have a length of more than 300 mm, in particular of more than 500 mm. It is important that the filter elements are attached securely in their filter housing. Since the filter media in operation become clogged with particles filtered out of the air, a regular exchange of the filter elements is required.

WO 2011/045220 A2 discloses a filter insert comprising a filter element with a frame circumferentially extending along the lateral surfaces of the filter element, wherein the frame carries an axial seal. The seal can be brought into contact with a sealing surface of a filter housing. The frame comprises at two oppositely positioned lateral surfaces of the filter insert a first and second contact surface for clamping the filter element by means of a first and a second clamping element. The filter insert can be inserted through a lateral mounting opening into the filter housing. The clamping elements can be embodied as clamping blades at a cover for closing the mounting opening.

It is the object of the invention to provide an air filter element, a filter housing, and an air filter that enable a simple exchange of the filter element.

SUMMARY OF THE INVENTION

The object is solved by an air filter element for an air filter for an internal combustion engine, with a filter medium that surrounds a longitudinal axis of the filter element annularly, wherein the filter element comprises a clean air seal for sealing a raw side of the air filter against a clean side of the air filter, wherein the clean air seal is embodied as one piece, in particular monolithically, with a first end disk into which the filter medium is embedded at a first end face of the filter element, and wherein the clean air seal is embodied so as to continuously radially protrude past the filter medium.

The object is further solved by a filter housing, in particular for receiving a filter element according to the invention, comprising a filter pot and a cover, wherein the filter pot comprises at a side wall a clean air outlet for filtered air, and preferably moreover comprises at the side wall a raw air inlet for air to be filtered, which is preferably arranged adjacent to the clean air outlet, in particular in the same angular orientation in relation to a housing center axis.

The object is further solved by an air filter comprising a filter element according to the invention and a filter housing according to the invention, wherein the clean air seal is arranged, held by being clamped, between the filter pot and the cover.

Preferred embodiments are disclosed in the dependent claims.

Air Filter Elements According to the Invention

According to the invention, an air filter element for an air filter for an internal combustion engine is provided. The filter element comprises a filter medium that surrounds in an annular shape the longitudinal axis of the filter element. The filter medium can surround the longitudinal axis in a circular ring shape. Preferably, the filter medium is not arranged with rotational symmetry in relation to the longitudinal axis. In this way, the flow through an air filter can be improved with the filter element and/or the effective surface of the filter element can be enlarged. Typically, the filter element can be flowed through in radial direction from the exterior to the interior. Typically, a length of the filter element, measured along the longitudinal axis, amounts to at least 500 mm. The filter element comprises a clean air seal for sealing a raw side of the air filter against a clean side of the air filter. The clean air seal in the mounted state of the filter element is resting seal-tightly at a filter housing of the air filter. The clean air seal can be embodied to seal axially or radially. The clean air seal is embodied as one piece, in particular monolithically, with a first end disk in which the filter medium is embedded at a first end face of the filter element. By means of the clean air seal, one piece together with the end disk, the configuration of the filter element is simplified. The filter medium can be embedded by casting in the end disk. Preferably, the clean air seal and the end disk are manufactured in a single common working step by primary shaping. The clean air seal is embodied to protrude continuously radially past the filter medium. This enables at the same time a simple configuration of the filter housing for the filter element and a simple exchange of the filter element. Due to the radial protrusion, the sealing action at the clean side of the air filter relative to the raw side can be realized at a housing wall of the filter housing. The protrusion of the clean air seal past the filter medium can be configured to be uniform in circumferential direction. Preferably, the amount of protrusion varies in the circumferential direction. In this way, additional degrees of freedom for the configuration of the filter housing are provided. In summary, the filter element in other words comprises a first end disk into which the filter medium is embedded at the first end face. A radial protrusion of the first end disk past the filter medium forms a clean air seal for sealing a raw side of the air filter against a clean side of the air filter. The clean air seal in circumferential direction extends continuously circumferentially and is embodied to protrude in this context continuously in radial direction.

Preferably, at the first end disk a bead is formed which projects axially past the first end disk and which partially surrounds a central opening in the first end disk. In other words, the bead can be embodied to partially surround the opening or partially circumferentially extend about the opening. Due to the bead, the support of the filter element in the filter housing, in particular at a cover of the filter housing, can be improved. In particular, the filter element can be guided by the bead in radial direction. The bead can center the filter element at the first end face in the filter housing. Particularly preferred, the bead is embodied monolithically with the first end disk.

A support structure can be embedded in the first end disk. The support structure is preferably embodied monolithically with a central tube of the filter element. By means of the support structure, the mechanical stability of the filter element can be improved. The above-described bead can be slightly displaced outwardly in radial direction relative to the central tube. An axial holding force for the filter element can then be introduced directly, in particular on a straight path, into the central tube.

The first end disk and the clean air seal are preferably manufactured with polyurethane. Particularly preferred, they are comprised of polyurethane. Polyurethane is a suitable material for sealing purposes which can be processed easily, in particular by casting. The end disk can comprise a first polyurethane material in a radially inner region and the clean air seal can comprise in a radially outer region a second polyurethane material that is softer than the first polyurethane material. In this way, the mechanical stability, in particular the stiffness, can be increased (radially inwardly) and the sealing ability can be improved (radially outwardly) at the same time.

At a second end face of the filter element, a second end disk can be arranged. Preferably, the filter medium is embedded at the second end face in the second end disk. Particularly preferred, the second end disk is of a closed configuration. Due to the closed configuration, flow through the second end disk is prevented. The second end disk can be embodied monolithic and without openings passing through (in axial direction). Alternatively, the second end disk can be of a multi-part configuration and comprise a closure element which is closing off in axial direction a through opening in a base body of the second end disk.

At the second end disk, two cams can be formed which project radially past the filter element and past an outer contour of the second end disk. By means of the cams, the orientation of the filter element in the filter housing can be defined. In particular, the projecting cams at the second end face can support the filter element in radial direction at the filter housing. By an engagement of the cams in corresponding depressions of the filter housing, the rotational orientation of the filter element relative to the longitudinal axis can be defined. Additionally, due to the projecting cams, elements that are arranged at the filter housing can be protected from contact with the filter element upon removal of the filter element from the filter housing and upon insertion of the filter element into the filter housing. In these working steps, the cams can rest at a housing wall and can keep the second end disk and the filter medium spaced apart from the housing wall. In particular, it can be prevented that a water outlet valve arranged in the housing wall can become damaged or does damage the filter element upon exchange of the filter element. The cams are preferably formed monolithically with the second end disk. A surface area of the (smallest) convex envelope of an axial projection of the second end disk with the two cams can be greater than the surface area of the axial projection. In addition to the two cams, further radially projecting cams can be present at the second end disk.

The two cams, in relation to the longitudinal axis, can be displaced relative to each other by at most 180°, preferably by at most 120°, particularly preferred by at most 100°. Moreover, the two cams, in relation to the longitudinal axis, can be displaced relative to each other by at least 30°, preferably by at least 45°, particularly preferred by at least 60°. Cams that are spaced apart from each other in this way are particularly effective for the aforementioned purposes.

At the second end disk, at least one axial projection can be formed. Due to the axial projection, the filter element can be supported at a bottom of the filter housing. Preferably, the axial projection is arranged in axial direction in extension of a central tube of the filter element. In this way, a direct force flow of an axial holding force for the filter element can be provided from the bottom of the filter housing through the at least one axial projection into the central tube.

Filter Housing According to the Invention

The filter housing according to the invention for a filter element according to the invention comprises a filter pot and a cover. The cover is detachably fastenable at the filter pot. Preferably, the cover is detachable from the filter pot and attachable to the filter pot in axial direction relative to a longitudinal axis of the filter pot. The cover can be screwable onto the filter pot. The filter pot comprises at a side wall a clean air outlet for filtered air. In other words, the clean air outlet can be oriented substantially radially to the longitudinal axis of the filter pot. When the filter element is inserted in the filter housing, preferably the longitudinal axes of the filter element and of the filter pot coincide with each other. The side wall can surround annularly the longitudinal axis of the filter housing. Due to the lateral clean air outlet, a compact construction of the filter housing in axial direction is enabled. Because the clean air outlet is formed at the filter pot, an air hose that guides the filtered air away from the clean air outlet can remain mounted at the filter housing when exchanging the filter element. In this way, the exchange of the filter element is simplified. Preferably, the filter pot furthermore has a raw air inlet for the air to be filtered at the side wall. This can further improve the compact construction of the air filter. The raw air inlet and the clean air outlet can point in the same direction. In particular, they can be oriented parallel to each other. This simplifies mounting of the filter housing at devices for air supply and air discharge. Between the clean air outlet and the raw air inlet, a contact surface for the clean air seal of the filter element can be embodied at the inner side at the side wall of the filter housing.

The filter pot is preferably closable at the clean side by the cover. In this way, the cover can be configured such that it interacts with the clean air seal of the filter element. In particular, the filter pot can comprise a large service opening that can be closed off by the cover. Through the service opening, the filter element can be inserted into the filter pot and removed from the filter pot.

Preferably, a secondary seal for sealing the cover relative to the filter pot is provided. In this way, an escape of filtered air from the clean side of the filter housing can be prevented. Also, it can be prevented that unfiltered air from the environment can reach the clean side. The secondary seal can comprise an O-ring. Preferably, the secondary seal comprises a 3D profile seal, in particular of foam rubber. A 3D profile seal is to be understood as a seal that is not completely arranged in a plane but, in sections thereof, projects from a plane in which another section of the seal extends. The secondary seal can be arranged in particular in a groove of the cover.

An air guide can be formed in the cover in order to guide filtered air from an interior of the filter element to the clean air outlet. This can reduce a flow resistance of the air filter. Preferably, the air guide interacts with a bead which is projecting past the first end disk and which partially surrounds a central opening in the first end disk of the filter element. In this way, the filter element can be aligned and held in the filter housing in the mounted state of the air filter.

At the cover, a projection can be formed in order to engage a central opening of the first end disk of the filter element. Preferably, the projection in the mounted state of the air filter engages partially circumferentially the central opening of the first end disk. In particular, the projection can project through the first end disk in axial direction. The projection is preferably arranged at the bottom in the installation position of the air filter. The projection can guide water that passes from the clean air outlet into the filter housing past the first end disk so that it can flow through the filter medium of the filter element to a water outlet valve of the filter housing. The projection is preferably embodied at an air guide of the cover. This simplifies the configuration of the cover.

The filter pot can comprise, preferably at the bottom side, two depressions for engagement of the cams of a filter element that comprises two radially projecting cams at the second end disk. The cams can be supported in the depressions in axial direction, radial direction, and in particular in circumferential direction. In this way, a correct orientation of the filter element in the filter housing can be ensured.

Air Filter According to the Invention

The air filter according to the invention comprises a filter element according to the invention and a filter housing according to the invention. According to the invention, it is provided that the clean air seal of the filter element is arranged, held by being clamped, between the filter pot and the cover. In this way, it can be reliably ensured that the clean air seal in the mounted state rests seal-tightly at the filter housing. Typically, the clean air seal seals against the filter pot. The clean air seal can rest at the filter pot to seal radially or axially. The clean air seal seals in the mounted state the raw side of the air filter against the clean side of the air filter. The cover can fix the filter element in the filter housing. In particular, the filter element in axial direction can be clamped between a bottom of the filter housing and the cover. Preferably, the force flow of an axial holding force for the filter element, as described above, passes through a central tube of the filter element. The first end disk and a second end disk of the filter element can establish an elastic deformation in longitudinal direction of the filter element in order to obtain a defined holding force in axial direction and permit a complete closure of the cover. In radial direction, the filter element can be supported with form fit at the filter pot and/or at the cover. In particular, a second end disk and/or radially projecting cams at the second end disk can be supported at the bottom side at the filter pot. A bead at the first end disk of the filter element that projects in axial direction can be supported at the cover with form fit in order to fix the filter element at the first end face in radial direction. The clean air seal is preferably decoupled from the force flow. In other words, the clean air seal does not participate in supporting the filter element in the filter housing. This improves the sealing action and avoids damage of the clean air seal by mechanical loads in operation.

BRIEF DESCRIPTION OF THE DRAWINGS

Further features and advantages of the invention result from the following detailed description of embodiments of the invention, from the claims as well as based on the Figures of the drawing that illustrate details according to the invention. The various features can be realized individually, respectively, or several in an arbitrary combination in variants of the invention. The features illustrated in the drawing are illustrated such that the particularities according to the invention can be made visible clearly.

FIG. 4a shows the filter element of FIGS. 3a, 3b in a schematic longitudinal section.

FIG. 4b shows a detail view of a first region of the end disk and of the clean air seal of the filter element of FIG. 4a.

FIG. 4c shows a detail view of a further region of the end disk and of the clean air seal of the filter element of FIG. 4a, wherein a bead projecting past the end disk can be seen.

FIG. 10a shows a detail of a further embodiment of an air filter according to the invention with an alternative design of a secondary seal between the filter pot and the cover in a view corresponding to FIG. 9a.

DESCRIPTION OF PREFERRED EMBODIMENTS

Figure 1:
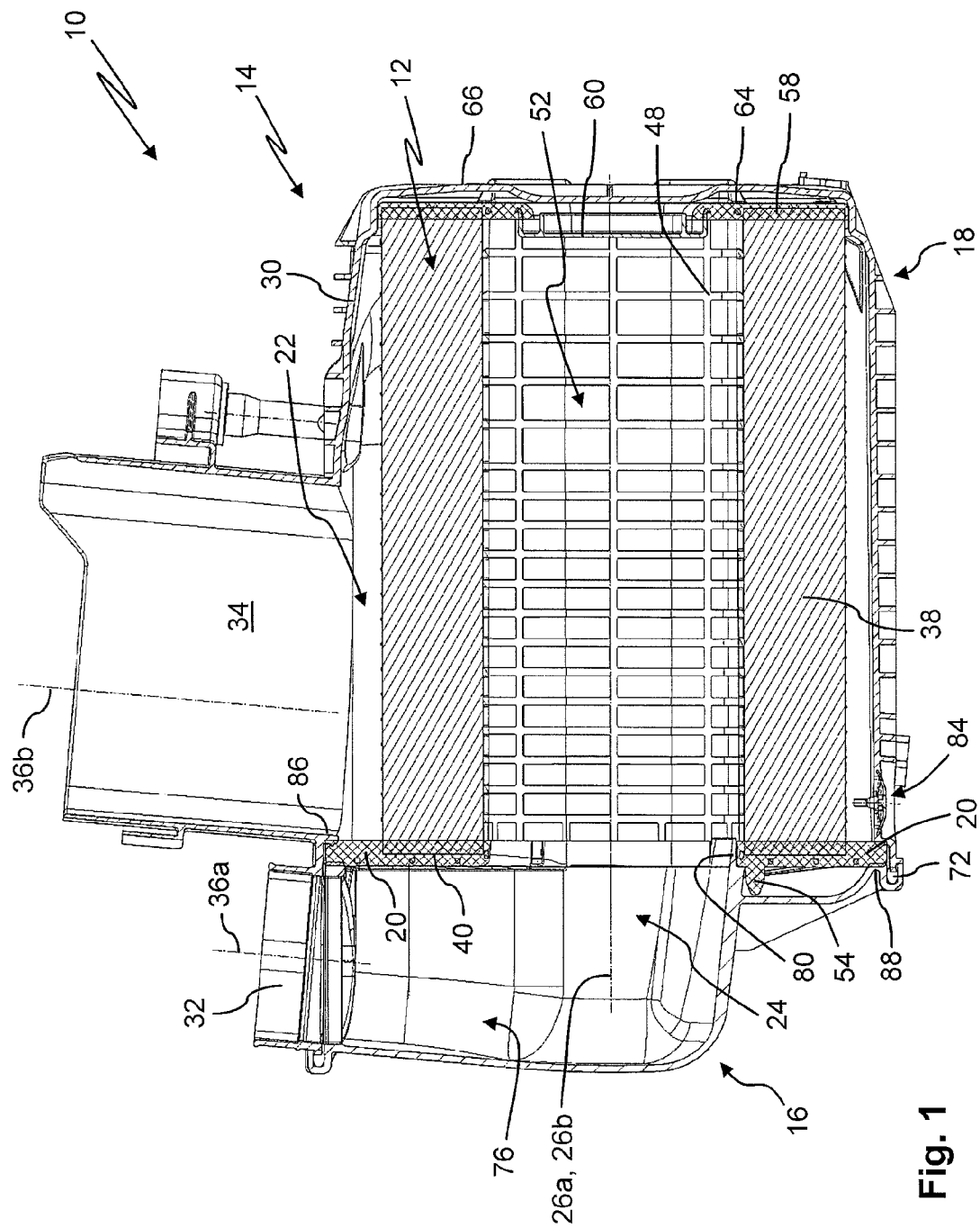
FIG. 1 shows an air filter according to the invention with an air filter element according to the invention mounted in a filter housing according to the invention, in a schematic longitudinal section.

FIG. 1 shows an air filter 10 according to the invention. The air filter 10 comprises an air filter element 12 according to the invention and a filter housing 14 according to the invention. The filter element 12 is arranged in the filter housing 14. A cover 16 of the filter housing 14 is placed onto a filter pot 18 of the filter housing 14. A clean air seal 20 of the filter element 12 is arranged, held by being clamped, between the cover 16 and the filter pot 18. The clean air seal 20 seals a raw side 22 of the air filter 10 against a clean side 24 of the air filter 10. The cover 16 is arranged at the clean side 24 of the air filter 10. In the mounted state of the air filter 10, a central longitudinal axis 26a of the filter element 12 coincides with a central longitudinal axis 26b of the filter pot 18. For a more detailed explanation of the details according to the invention, reference is being had in addition to the following FIGS. 2 to 9b.

Figure 2:
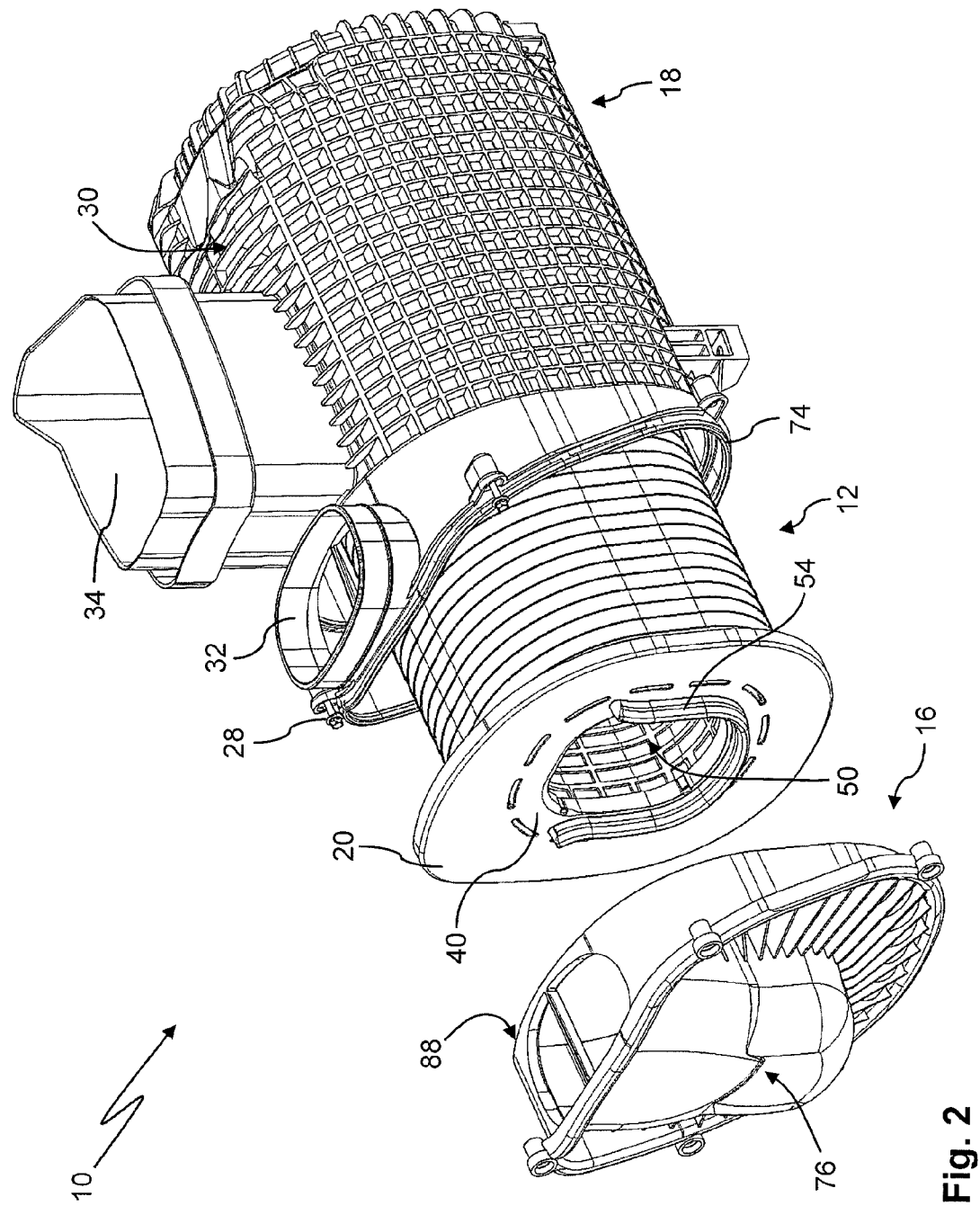
FIG. 2 shows a schematic exploded illustration of the air filter of FIG. 1.

FIG. 2 shows an exploded illustration of the air filter 10 of FIG. 1. The cover 16 is lifted off the filter pot 18. The filter element 12 projects partially out of the filter pot 18. For detachable attachment of the cover 16 at the filter pot 18, screws 28 are provided of which one is provided with a reference character in FIG. 2. The screws 28 in the mounted state can be support, on the one hand, at the cover 16 and, on the other hand, engage the filter pot 18. In order to be able to insert the filter element 12 into the filter pot 18 or remove it from the filter pot 18, the cover 16 (with the screws 28 loosened) can be removed in axial direction from the filter pot 18. The filter element 12 can then be inserted in axial direction into the filter pot 18 or pulled out of the filter pot 18.

At a side wall 30 of the filter pot 18, a clean air outlet 32 and a raw air inlet 34 are formed. The side wall 30 surrounds the longitudinal axis 26a in an annular shape. In particular, the longitudinal axis 26b does not intersect the side wall 30. The clean air outlet 32 and the raw air inlet 34 are designed parallel to each other here and point in the same direction. They extend substantially radially relative to the longitudinal axis 26b. An outlet axis 36a and an inlet axis 36b are positioned at an angle of approximately 85° relative to the longitudinal axis 26b. Since the clean air outlet 32 and the raw air inlet 34 are formed at the side wall 30 of the filter pot 18, they can remain connected to hoses (not illustrated) of an air guiding system upon exchange of the filter element 12. By means of the air guiding system, in particular air to be filtered can be supplied to the raw air inlet 34 and filtered air can be guided from the clean air outlet 32 to an internal combustion engine.

Figure 3B:
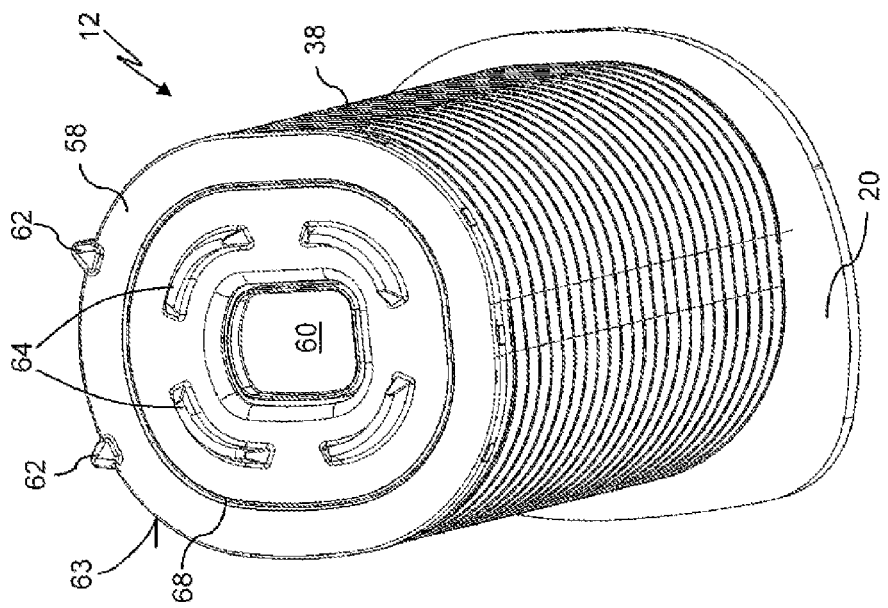
FIG. 3b shows the filter element of the air filter of FIG. 1 in a further perspective illustration looking at a second end disk.
Figure 3A:
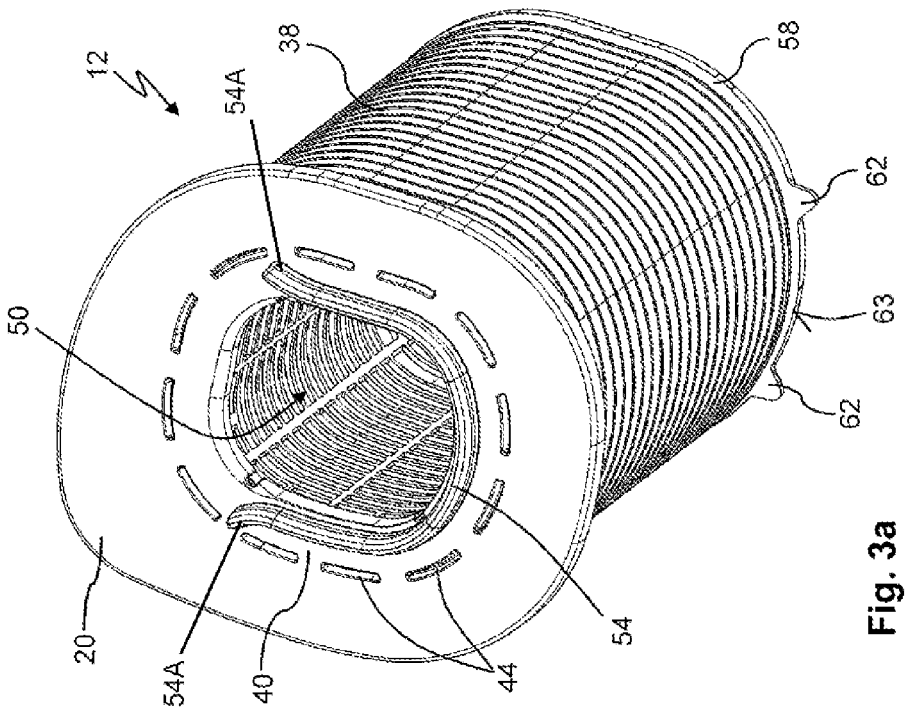
FIG. 3a shows the filter element of the air filter of FIG. 1 in a perspective illustration looking at a first end disk with a clean air seal.

In FIG. 3a and FIG. 3b, the air filter element 12 according to the invention is illustrated in two perspective views. FIG. 4a shows a longitudinal section of the filter element 12. In FIG. 4b, a detail of the right upper region of FIG. 4a is illustrated enlarged. FIG. 4c shows a detail of the left upper region of FIG. 4a in an enlarged view.

The filter element 12 comprises a filter medium 38. The filter medium 38 surrounds the longitudinal axis 26a in an annular shape. The filter medium 38 here is not embodied in a circular ring shape but is laterally flattened. The filter medium 38 is formed here by a star-shaped folded filter bellows.

The filter element 12 comprises a first end disk 40 at a first end face 42. The filter medium 38 is embedded in the first end disk 40. The clean air seal 20 is embodied monolithically with the first end disk 40. The clean air seal 20 protrudes in radial direction relative to the longitudinal axis 26a continuously circumferentially about the filter medium 38. In other words, the clean air seal 20 is formed by the section of the first end disk 42 that radially protrudes past the filter medium 38. Here, the amount of protrusion of the clean air seal 20 is variable in circumferential direction, see in particular FIG. 3b. For manufacture-technological reasons, in the first end disk 40, there are embossments 44 of spacers of a casting mold (not illustrated) in which the first end disk 40 with the clean air seal 20 has been cast onto the filter medium. The first end disk 40 and the clean air seal 20 are comprised here of polyurethane.

A support structure 46 is embedded in the first end disk 40. The support structure 46 here is embodied monolithically with a central tube 48 of the filter element 12. The filter medium 38 is positioned radially inwardly at the central tube 48. The support structure 46 is embodied here in the region of the first end disk 40 in a grid shape with radial stays 46a and rings 46b extending circumferentially in circumferential direction.

The first end disk 40 comprises a central opening 50. The central opening 50 opens an interior 52 of the filter element 12 to the exterior. At the first end disk 40, an axially outwardly projecting bead 54 is embodied here. The bead 54 projects in axial direction past the first end disk 40. In other words, the bead 54 projects away from the first end disk 40 in the direction of the longitudinal axis 26a. The bead 54 is here monolithically embodied with the first end disk 40 and the clean air seal 20. In the mounted state of the air filter 10, the bead 54 can interact with the cover 16. In particular, the bead 54 can be supported at the cover 16 in radial direction.

As shown in FIGS. 2 and 3a, the bead 54 is arranged at an outer circumference of the central opening 50 on the first end disk 40 and surrounds at least half of the outer circumference of the central opening 50 Here, the bead 54 is arranged at and surrounds approximately three fourths of the outer circumference of the central opening 50. As is shown in FIG. 3a, the axially outwardly projecting bead 54 is a U-shaped bead having two free ends 54A. As shown in FIG. 3a, the U-shaped bead at the free ends 54A curves radially outwardly away from the longitudinal axis 26a.

At a second end face 56 of the filter element 12, a second end disk 58 is arranged. The filter medium 38 is embedded at the second end face 56 in the second end disk 58. The second end disk 58 is embodied of a closed configuration in axial direction. The second end disk 58 comprises here a closure element 60. By means of the second end disk 58, an inflow or outflow of air into or out of the interior 50 is prevented at the second end face 56. A base body of the second end disk 58 is manufactured here of polyurethane; the closure element 60 can be manufactured of a different material, in particular of a non-elastomer plastic material.

At the second end disk, two cams 62 (see FIGS. 3a, 3b) are formed here. The cams 62 project in radial direction relative to the longitudinal axis 26a past the filter medium 38 and an outer contour 63 of the second end disk 58. The two cams 62 can be arranged displaced relative to each other in relation to the longitudinal axis 26a by an angle of 70°, for example. This means that connecting lines (not illustrated) of the cams 62 to the longitudinal axis 26a are positioned at an angle of 70° relative to each other.

At the second end disk 58, furthermore four axial projections 64 are formed here of which in FIG. 3b two are provided with a reference character. The axial projections 64 project in axial direction past the second end disk 58. The axial projections 64 are arranged in axial direction in extension of the central tube 48. By means of the axial projections 64, the filter element 12 can be supported at a bottom 66 (see FIG. 1) of the filter pot 18.

For manufacture-technological reasons, the second end disk 58 comprises—like the first end disk 40—an embossments 68 that has been caused by a spacer of a casting mold (not illustrated). The embossment 68 of the second end disk 58 is here embodied to continuously extend circumferentially.

Figure 5:
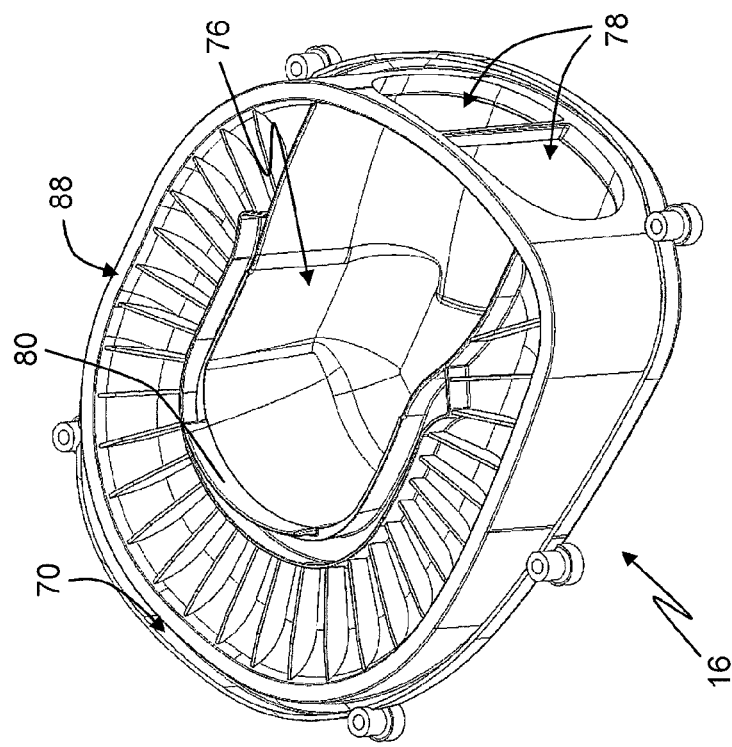
FIG. 5 shows the cover of the filter housing of FIG. 1 in a perspective illustration looking at its inner side.

FIG. 5 shows the cover 16 of the filter housing 14 in a perspective view of the inner side. A groove 70 is formed externally at the cover 16 so as to extend circumferentially. A secondary seal 72 (see FIG. 1) can be inserted into the groove 70. The secondary seal 72 can comprise an O-ring. By means of the secondary seal 72, the cover 16 is sealed against the filter pot 18 in the mounted state of the air filter 10. Here, the secondary seal 72 seals the clean side 24 of the air filter 10 against the environment of the air filter 10. Upon attachment of the cover 16 at the filter pot 18, the secondary seal 72 is compressed between a circumferential collar 74 of the filter pot 18 and the groove 70 of the cover 16.

An air guide 76 is embodied in the cover 16. The air guide 76 serves for guiding the filtered air out of the interior 52 of the filter element 12 to the clean air outlet 32 of the filter housing 14. The air guide 76 comprises here two outlet openings 78 which communicate with the clean air outlet 32 in the side wall 30 of the filter pot 18 in the mounted state.

At the cover 16, here in the region of the air guide 76, a projection 80 is formed. In the mounted state of the air filter 10, the projection 80 engages the central opening 50 in the first end disk 40 of the filter element 12, see FIG. 1. In particular, the projection 80 can pass through the first end disk 40 in the central opening 50 in axial direction.

Figure 6:
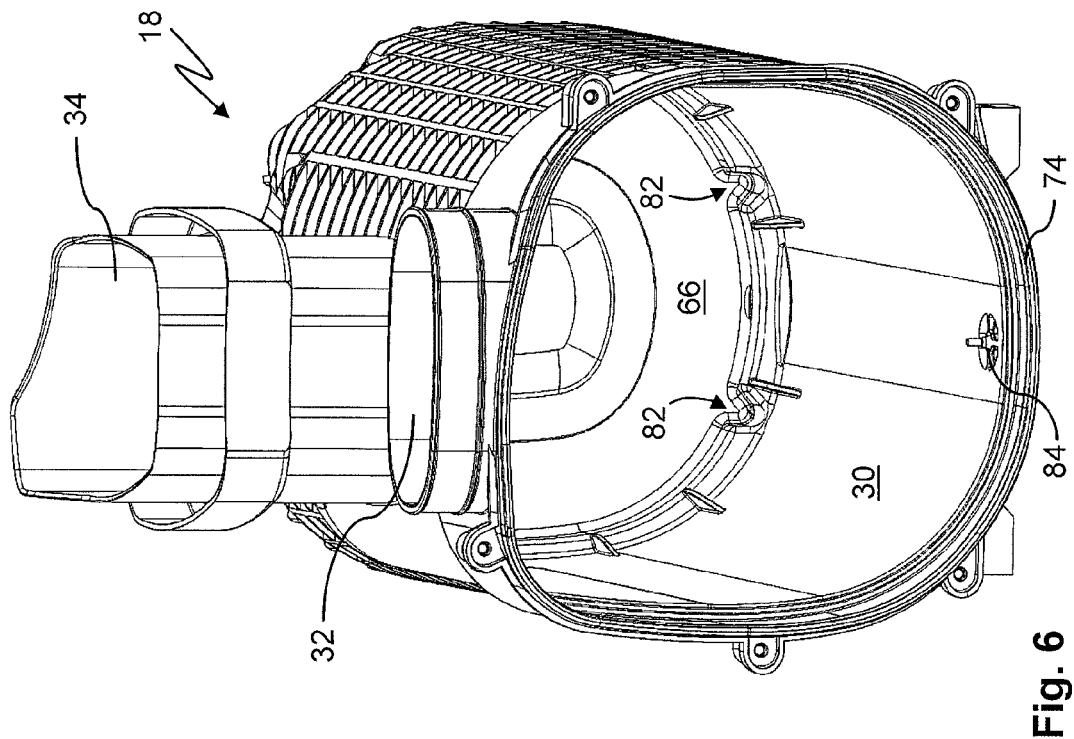
FIG. 6 shows the filter pot of the filter housing of FIG. 1 in a first perspective view, wherein two bottom-side depressions can be seen.

FIG. 6 shows the filter pot 18 in a first perspective view. At the bottom side, i.e., in the region of a bottom 66 of the filter pot 18, two depressions 82 are formed in the filter pot 18. The depressions 82 are embodied to correspond with the cams 62 (compare FIG. 3a, 3b) at the second end disk 58 of the filter element 12. In the mounted state of the air filter 10, the cams 62 engage the depressions 82. In this way, a defined orientation of the filter element 12 in the filter pot 18 is established.

In the filter pot 18, a water outlet valve 84 is provided. The water outlet valve 84 is arranged here in relation to the longitudinal axis 26b oppositely positioned to the clean air outlet 32 and the raw air inlet 34 in the side wall 30 of the filter pot 18.

Figure 8:
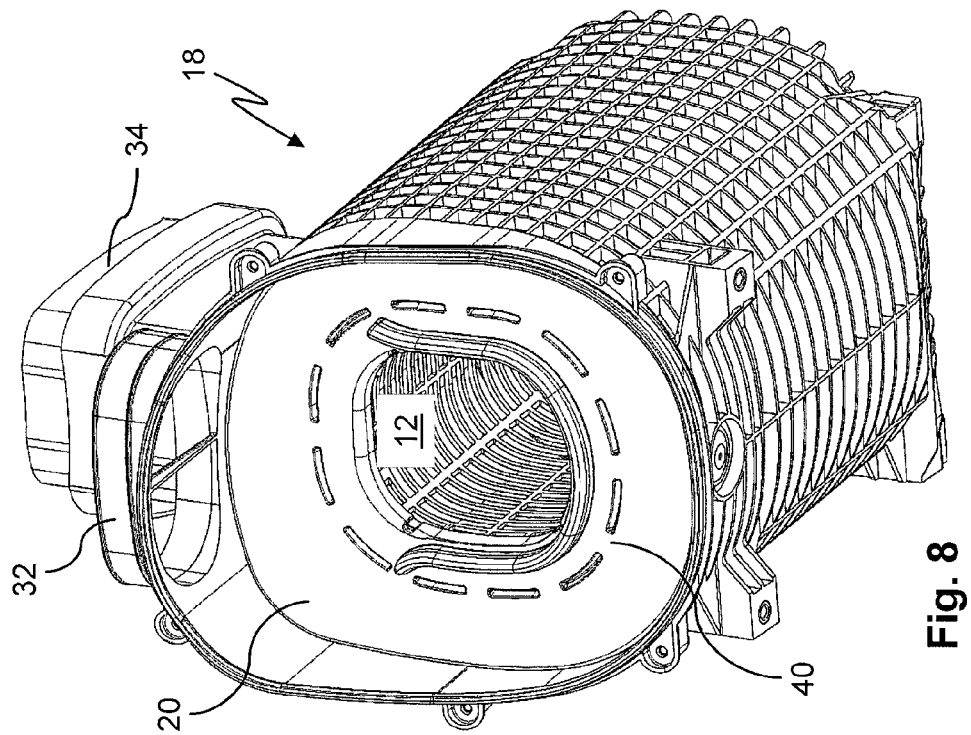
FIG. 8 shows the filter pot in the view of FIG. 7 with inserted filter element.
Figure 7:
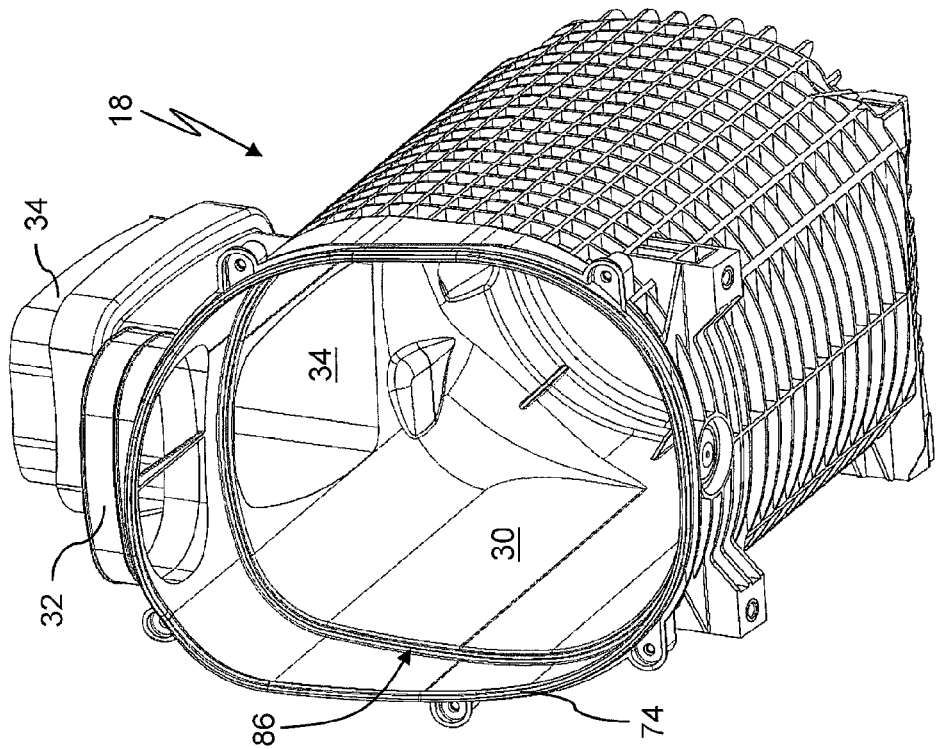
FIG. 7 shows the filter pot of the filter housing of FIG. 1 in a second perspective view looking from the interior onto a clean air outlet and a raw air inlet.

FIG. 7 shows the filter pot 18 in a second perspective view. The filter pot 18 comprises a circumferentially extending shoulder 86. The shoulder 86 extends between the clean air outlet 32 and the raw air inlet 34 circumferentially at the side wall 30 of the filter pot 18. In the mounted state of the air filter 10, the clean air seal 20 of the filter element 12 is resting on the shoulder 86 of the filter pot, compare FIG. 1. FIG. 1 and FIG. 8 show that the clean air seal 20 is arranged between the raw air inlet 34 and the clean air outlet 32 so that it separates the clean side 24 of the air filter 10 from the raw side 22 of the air filter 10.

In order to ensure the seal-tight contact of the clean air seal 20 at the filter pot 18, the clean air seal 20 is held by being clamped in the mounted state between the circumferentially extending shoulder 86 of the filter pot 18 and the cover 16. The cover 16 comprises a circumferentially extending pressure ring 88 (see FIG. 9a). In the mounted state of the air filter 10, the pressure ring 88 forces the clean air seal 20 against the filter pot 18, in particular against its circumferentially extending shoulder 86.

Figure 9B:
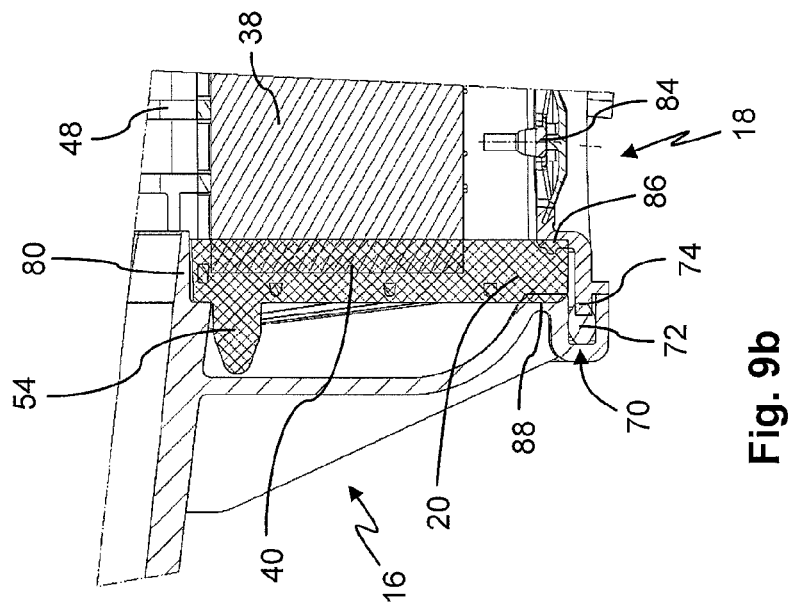
FIG. 9b shows a detail of FIG. 1 in a region of the cover positioned opposite the clean air outlet.
Figure 9A:
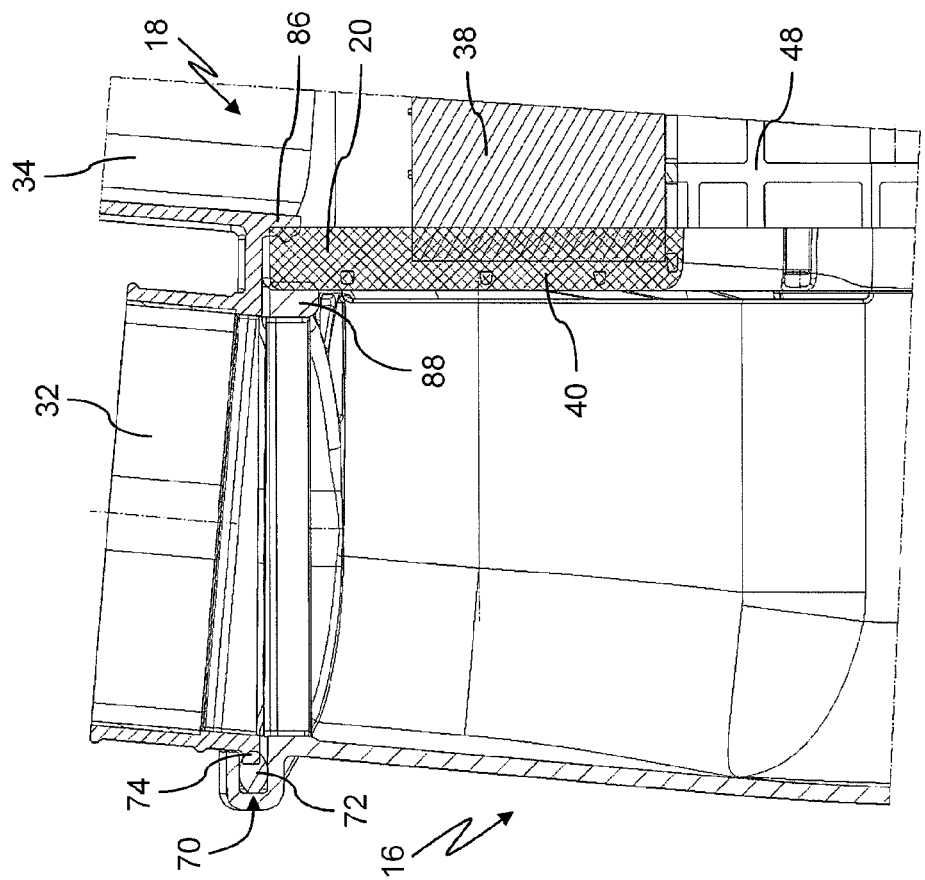
FIG. 9a shows a detail of FIG. 1 in the region of the clean air outlet.

FIG. 9a shows an enlarged detail of the air filter 10 of FIG. 1 in the region of the clean air outlet 32 and of the raw air inlet 34. It can be seen well that the clean air seal 20 is compressed between the circumferentially extending shoulder 86 of the filter pot 18 and the circumferentially extending pressure ring 88 of the cover 16. The cover is resting seal-tightly, presently with the pressure ring 88 axially, against the clean air seal 20 or the first end disk 40. In other words, the clean air seal 20 is clamped between the cover 16 and the filter pot 18. Due to the elastic deformation of the clean air seal 20 produced thereby, it is achieved that it is contacting seal-tightly the filter pot 18. It is conceivable alternatively or additionally that an annularly circumferentially extending sealing contact surface of the cover is resting preferably radially against a corresponding (radial) sealing surface at the end disk 40 so that the cover 16, in particular separating the raw side and the clean side, provides an air guide to the clean air outlet 32. In this case, it is expedient that the cover 16 comprises a wall section that seal-tightly connects the sealing contact surface with the side wall 30, preferably extends radially away from the sealing contact surface outwardly to the side wall 30 of the filter pot 18, and/or continues the separation plane formed by the end disk 40.

Moreover, in FIG. 9a it can be seen that the secondary seal 72 is forced by the circumferentially extending collar 74 of the filter pot 18 into the circumferentially extending groove 70 of the cover 16. In this way, it is ensured that the cover 16 is sealed relative to the filter pot 18.

FIG. 9b shows an enlarged detail of the air filter of FIG. 1 in a region oppositely positioned to the clean air outlet 32 and the raw air inlet 46 in relation to the longitudinal axis 26a. In this region, the water outlet valve 84 is also arranged in the side wall 30 of the filter pot 18. Here, it can be seen also that the secondary seal 72 is forced by the collar 74 of the filter pot 18 into the groove 70 of the cover 16.

The clean air seal 20 is clamped between the shoulder 86 of the filter pot 18 and the pressure ring 88 of the cover 16.

In FIG. 9b, it can also be seen clearly that the projection 80 of the cover 16 engages the central opening 50 of the filter element 12 and passes through the first end disk 40 in axial direction. The cover 16 in addition interacts in a region of the air guide 76 in which also the projection 80 is formed with the bead 54 which projects in axial direction away from the first end disk 40. Due to the projection 80, water which has passed from the clean air outlet 32 into the air filter 10 can be guided past the first end disk 40. The water flows then through the filter medium 38 to the water outlet valve 84. There, it can be discharged from the filter housing 14.

Figure 10B:
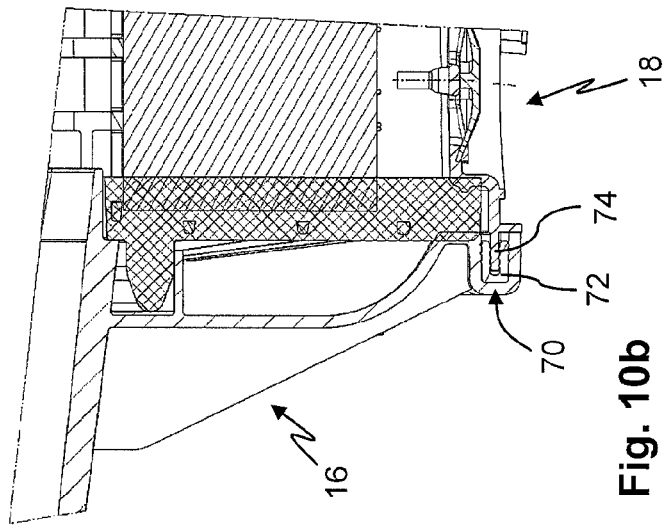
FIG. 10b shows the further embodiment of the air filter with the alternative design of the secondary seal of FIG. 10a in a view as in FIG. 9b.
Figure 10A:
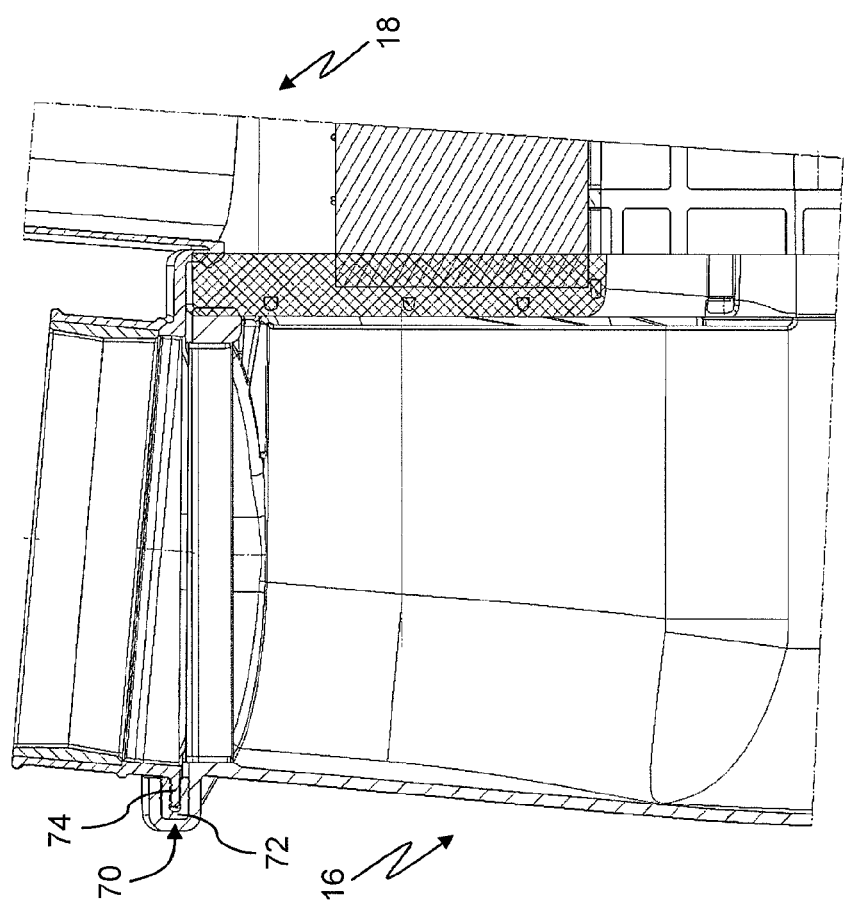

In FIG. 10a and FIG. 10b, an alternative design of the secondary seal 72 is illustrated. The views of FIG. 10a and FIG. 10b correspond to those of FIG. 9a and FIG. 9b. Also, the air filter—aside from the differences in the region of the secondary seal 72—is constructed like the air filter 10 according to FIG. 1 to FIG. 9b. Therefore, only the differences will be explained.

The secondary seal 72 is formed here by a three-dimensional profile seal. The profile seal can be manufactured of foam rubber. The profile seal—like the O-ring of the first embodiment—is inserted into a circumferentially extending groove 70 in a cover 16 of a filter housing. A circumferentially extending collar 74 at a filter pot 18 of the filter housing projects in the mounted state into the profile seal. The profile seal is thereby compressed between the collar 72 and the groove 70 so that the cover 16 and the filter pot 18 are sealed relative to each other.

Figure 11:
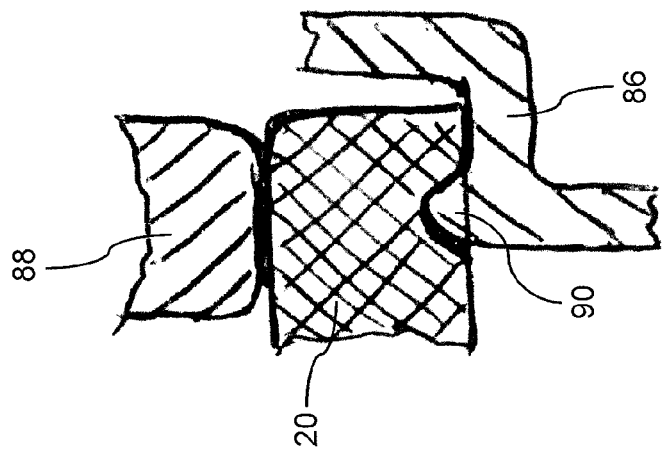
FIG. 11 shows a first variant of an axially sealing clean air seal of an air filter element according to the invention in the compressed state between a filter pot and a cover of a filter housing according to the invention, in a schematic section illustration.

FIG. 11 shows a first variant of an axially sealing clean air seal 20 of an air filter element according to the invention. The clean air seal 20 is compressed between a shoulder 86 of a filter pot and a pressure ring 88 of a cover for the filter pot. At the shoulder 86, a circumferentially extending protrusion 90 is formed here radially inwardly. The protrusion 90 is forced in the compressed state into the clean air seal 20. In this way, in this region the contact area pressure is increased so that the sealable pressure difference increases.

Figure 12:
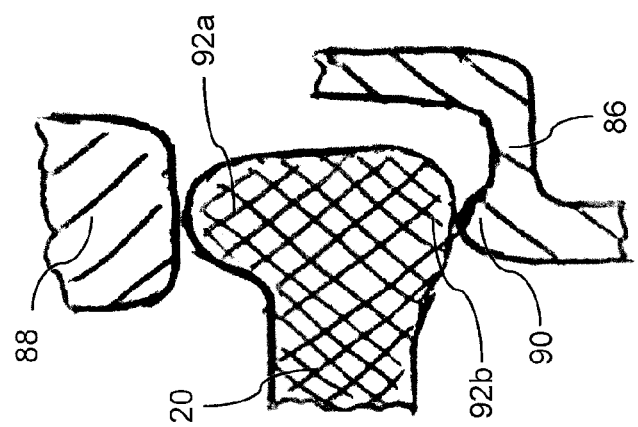
FIG. 12 shows a second variant of an axially sealing clean air seal of an air filter element according to the invention in the uncompressed state between a filter pot and a cover of a filter housing according to the invention, in a schematic section illustration.

FIG. 12 shows a second variant of an axially sealing clean air seal 20 of an air filter element according to the invention. The clean air seal 20 is shown here in the uncompressed state between a shoulder 86 of a filter pot and a pressure ring 88 of a cover for the filter pot. As in FIG. 11, the shoulder 86 comprises a circumferentially extending protrusion 90. The clean air seal 20 comprises radially outwardly at the top side (clean side) as well as at the bottom side (raw side) a circumferentially extending thicker portion 92a, 92b, respectively. This can further increase the contact area pressure that occurs in the compressed state. In addition, the hold of the clean air seal 20 between the shoulder 86 and the pressure ring 88 is improved.

Figure 13:
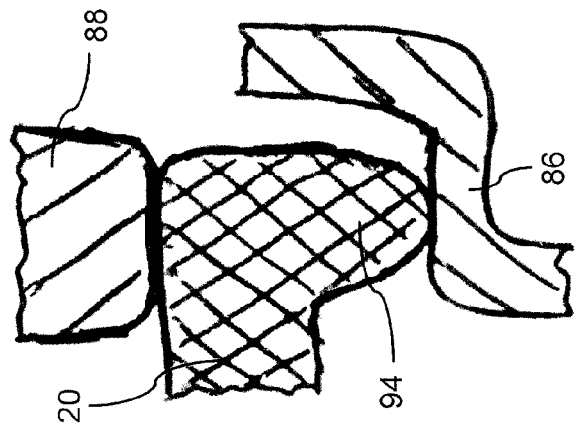
FIG. 13 shows a third variant of an axially sealing clean air seal of an air filter element according to the invention in the uncompressed state between a filter pot and a cover of a filter housing according to the invention, in a schematic section illustration.

FIG. 13 shows a third variant of an axially sealing clean air seal 20 of an air filter element according to the invention. The clean air seal 20 is illustrated here in the uncompressed state between a shoulder 86 of a filter pot and a pressure ring 88 of a cover for the filter pot. The shoulder 86 and the pressure ring 88 are here embodied respectively with a non-contoured (flat) surface for contacting the clean air seal 20. The clean air seal 20 comprises at the bottom side (raw side) a distinct thicker portion 94. In the region of the thicker portion 94, the clean air seal 20 is here circumferentially approximately twice as thick as in the region not made thicker. This configuration also increases the contact area pressure occurring in the compressed state between the clean air seal 20 and the shoulder 86 for an improved sealing ability.

Figure 14:
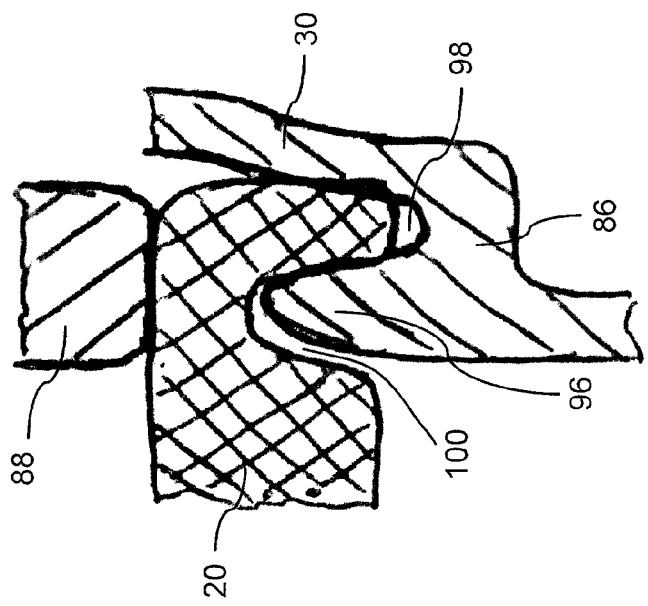
FIG. 14 shows a first variant of a radially sealing clean air seal of an air filter element according to the invention in the compressed state between a filter pot and a cover of the filter housing according to the invention, in a schematic section illustration.

FIG. 14 shows a first variant of a radially sealing clean air seal 20 of an air filter element according to the invention. The clean air seal 20 is illustrated in the compressed state between a shoulder 86 of a filter pot and a pressure ring 88 of a cover for the filter pot. The pressure ring 88 is non-contoured at the sealing side. The shoulder comprises radially inwardly a circumferentially extending nose 96. Between the nose 96 and a side wall 30 of the filter pot, a sealing groove 98 is formed which tapers in axial direction. The clean air seal 20 comprises at the bottom side (raw side) a circumferentially extending first sealing groove 100 that tapers in axial direction. A section of the clean air seal 20, located radially outwardly of the sealing groove 100, is forced in the mounted state by the pressure ring 88 into the sealing groove 98 so that this section of the clean air seal 20 is contacting seal-tightly walls of the sealing groove 98.

Figure 15:
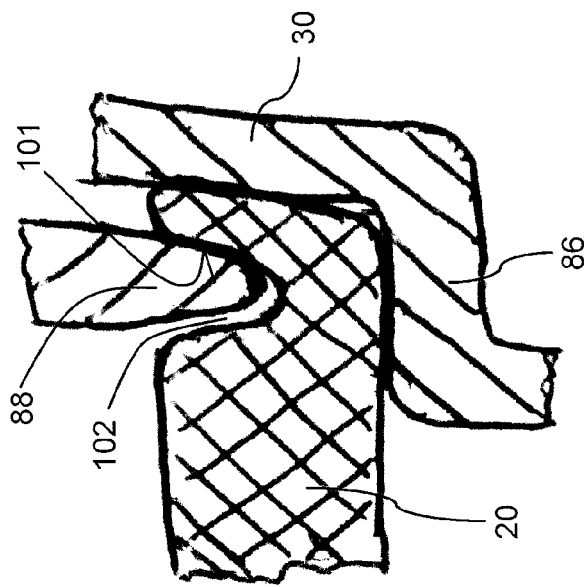
FIG. 15 shows a second variant of a radially sealing clean air seal of an air filter element according to the invention in the compressed state between a filter pot and a cover of a filter housing according to the invention, in a schematic section illustration.

FIG. 15 shows a second variant of a radially sealing clean air seal 20 of an air filter element according to the invention. The clean air seal 20 is illustrated in the compressed state between a shoulder 86 of a filter pot and a pressure ring 88 of a cover for the filter part. The shoulder 86 is embodied non-contoured. The pressure ring 88 is embodied radially outwardly with an annular contour 101 that is positioned at an acute angle relative to a common longitudinal axis of the filter element and of the filter pot. The clean air seal 20 comprises at the top side (clean side) a circumferentially extending second sealing groove 102 which tapers in the axial direction. A section of the clean air seal 20, positioned radially outwardly of the sealing groove 102, tapers therefore opposite to the sealing groove 102. This section of the clean air seal 20 is pressed in the mounted state by the pressure ring 88 against a side wall 30 of the filter pot so that the clean air seal 20 is resting seal-tightly thereat.

What is claimed is:

1. An air filter element comprising:
   a filter medium spaced radially away from and surrounding annularly a longitudinal axis of the air filter element;
   wherein radial, as used herein, is a direction transverse to the longitudinal axis;
   wherein axial, as used herein, is a direction defined by the longitudinal axis;
   a first end disk at a first end face of the air filter element, wherein the filter medium is embedded in the first end disk at the first end face;
   a clean air seal configured to seal a raw side of an air filter against a clean side of the air filter;
   wherein the clean air seal and the first end disk are embodied together as one piece;
   wherein the clean air seal is embodied to continuously protrude radially outwardly beyond the filter medium;
   the filter element further comprising:
   a central opening formed in the first end disk and opening into an interior of the filter medium;
   a bead arranged on the first end disk at an outer circumference of the central opening, the bead surrounding at least half of the outer circumference of the central opening, the bead projecting at the central opening in a direction axially outwardly away from the filter medium,
   wherein the beast is a U-shaped bead having two free ends; and
   wherein the U-shaped bead at each of the two free ends curves radially outwardly away from the longitudinal axis.

2. The air filter element according to claim 1, wherein the clean air seal and the first end disk are formed together monolithically.

3. The air filter element according to claim 1, wherein the bead surrounds approximately three fourths of the outer circumference of the central opening.

4. The air filter element according to claim 3, wherein the bead and the first end disk are formed together monolithically.

5. The air filter element according to claim 1, further comprising
   a support structure embedded in the first end disk.

6. The air filter element according to claim 5, further comprising
   a central tube,
   wherein the support structure and the central tube are formed together monolithically.

7. The air filter element according to claim 1, further comprising
a second end disk arranged at a second end face of the air filter element,
wherein the filter medium is embedded in the second end disk at the second end face.

8. The air filter element according to claim 7, wherein the second end disk is of a closed configuration.

9. The air filter element according to claim 7, wherein the second end disk comprises two cams,
wherein the two cams project radially past the filter medium and past an outer contour of the second end disk.

10. The air filter element according to claim 9, wherein the two cams are displaced relative to each other in relation to the longitudinal axis by at most 180° and by at least 30°.

11. The air filter element according to claim 7, wherein the second end disk comprises at least one axial projection.

12. The air filter element according to claim 11, wherein the at least one axial projection is arranged in an axial direction as an extension of a central tube of the air filter element.

13. A filter housing for receiving the air filter element according to claim 1, the filter housing comprising:
a filter pot and a cover,
wherein the filter pot comprises a side wall having a clean air outlet arranged at the side wall and a raw air inlet arranged at the side wall,
wherein the raw air inlet is arranged adjacent to the clean air outlet;
an air guide arranged in an interior of the cover, the air guide forming an axial projection configured to contact seal-tightly against the bead of the first end disk of the filter element when in an installation position of the air filter element;
wherein the axial projection is configured to engage and pass through the central opening of the filter element in the axial direction when in the installation position of the air filter element.

14. The filter housing according to claim 13, wherein the raw air inlet and the clean air outlet are arranged in the same angular orientation in relation to a housing center axis of the filter housing.

15. The filter housing according to claim 13, wherein the cover closes the filter pot at a clean side of the air filter element.

16. The filter housing according to claim 13, further comprising
a secondary seal configured to seal the cover relative to the filter pot.

17. The filter housing according to claim 13, wherein the cover comprises
a sealing surface configured to contact seal-tightly the first end disk of the air filter element.

18. The filter housing according to claim 17, wherein the first end disk of the air filter element is an open end disk,
wherein the sealing surface of the cover contacts seal-tightly the open end disk to provide a seal-tight connection to an interior of the air filter element.

19. The filter housing according to claim 13, wherein the filter pot comprises
at least one depression configured to engage at least one corresponding cam arranged at a second end disk of the air filter element and projecting radially past the filter medium and past an outer contour of the second end disk.

20. An air filter comprising:
a filter housing comprising
a filter pot and a cover,
wherein the filter pot comprises a side wall and a clean air outlet arranged at the side wall and a raw air inlet arranged at the side wall;
an air filter element arranged in the filter housing, the air filter element comprising:
a filter medium spaced radially away from and surrounding annularly a longitudinal axis of the air filter element;
wherein radial, as used herein, is a direction transverse to the longitudinal axis;
wherein axial, as used herein, is a direction defined by the longitudinal axis;
a first end disk at a first end face of the air filter element,
wherein the filter medium is embedded in the first end disk at the first end face;
a clean air seal configured to seal a raw side of the air filter against a clean side of the air filter;
wherein the clean air seal and the first end disk are embodied together as one piece;
wherein the clean air seal is embodied to continuously radially protrude radially outwardly past the filter medium;
the filter element further comprising:
a central opening formed in the first end disk and opening into an interior of the filter medium; and
a bead arranged on the first end disk, the bead projecting axially outwardly away from the first end disk and the filter medium, the bead arranged about an outer circumference of the central opening and surrounds at least half of the outer circumference of the central opening;
wherein the clean air seal is arranged, held and clamped, between the filter pot and the cover.

21. The air filter according to claim 20, wherein
the bead is a U-shaped bead having two free ends; and
wherein the U-shaped bead at the free ends curves radially outwardly away from the longitudinal axis.

22. A filter housing comprising:
an air filter element comprising:
a filter medium spaced radially away from and surrounding annularly a longitudinal axis of the air filter element;
a first end disk at a first end face of the air filter element,
wherein the filter medium is embedded in the first end disk at the first end face;
a clean air seal configured to seal a raw side of the filter housing against a clean side of the filter housing;
a central opening formed in the first end disk and opening into an interior of the filter medium;
a bead arranged on the first end disk at an outer circumference of the central opening, the bead surrounding at least half of the outer circumference of the central opening, the bead projecting at the central opening in an axial direction relative to the longitudinal axis outwardly away from the filter medium;
a filter pot and a cover for receiving the air filter element,
wherein the filter pot comprises a side wall having a clean air outlet arranged at the side wall and a raw air inlet arranged at the side wall,
wherein the raw air inlet is arranged adjacent to the clean air outlet;

an air guide arranged in an interior of the cover, the air guide comprising two outlet openings which align with and communicate with the clean air outlet in the side wall of the filter pot.

* * * * *